US012754873B2

(12) United States Patent
Chou et al.

(10) Patent No.: US 12,754,873 B2
(45) Date of Patent: Oct. 6, 2026

(54) DEBUGGING SYSTEM METHOD USING UNIVERSAL ASYNCHRONOUS RECEIVER/TRANSMITTER (UART) INTERFACE BY SWITCHING BETWEEN USB OR ETHERNET INTERFACE FOR DATA TRANSMISSION REQUIREMENT

(71) Applicant: Lite-On Technology Corporation, Taipei (TW)

(72) Inventors: Jin-Jye Chou, Taipei (TW); Rungsheng Jen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 91 days.

(21) Appl. No.: 18/925,026

(22) Filed: Oct. 24, 2024

(65) Prior Publication Data

US 2025/0130970 A1 Apr. 24, 2025

Related U.S. Application Data

(60) Provisional application No. 63/592,583, filed on Oct. 24, 2023.

(30) Foreign Application Priority Data

Jul. 23, 2024 (CN) ......................... 202410992241.2

(51) Int. Cl.
*G06F 13/00* (2006.01)
*G06F 13/38* (2006.01)
*G06F 13/42* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ............... G06F 13/4282; G06F 13/382; G06F 2213/0042; G06F 13/00
See application file for complete search history.

(56) References Cited

U.S. PATENT DOCUMENTS 11,921,663 B2 * 3/2024 Hu .......................... G06F 13/38
12,093,205 B2 * 9/2024 Chen ..................... G06F 13/382
(Continued)

FOREIGN PATENT DOCUMENTS

CN 101464724 6/2009
CN 102750252 10/2012
(Continued)

OTHER PUBLICATIONS

"Office Action of Taiwan Counterpart Application", issued on Dec. 10, 2024, p. 1-p. 7.
(Continued)

*Primary Examiner* — Tammara R Peyton
(74) *Attorney, Agent, or Firm* — JCIPRNET

(57) ABSTRACT

A system and a method for interface management are provided. The system includes a main processor, a switch, and a first sub-circuit. The main processor includes a universal asynchronous receiver-transmitter (UART) interface and a control interface. The switch is coupled to the UART interface and the control interface. The first sub-circuit includes a first sub-interface. The first sub-interface is coupled to the switch. The switch conducts a transmission path between the UART interface and the first sub-interface according to a control signal received through the control interface. A single UART interface could be used to connect multiple sub-circuits having the UART interface.

10 Claims, 9 Drawing Sheets

(56) References Cited

U.S. PATENT DOCUMENTS

| | | | | |
|---|---|---|---|---|
| 2011/0271159 A1* | 11/2011 | Ahn | .................... | G06F 11/2733<br>714/724 |
| 2013/0262928 A1* | 10/2013 | Yang | ..................... | G06F 11/267<br>714/E11.17 |

FOREIGN PATENT DOCUMENTS

| | | |
|---|---|---|
| CN | 103365753 | 10/2013 |
| CN | 105205022 | 12/2015 |
| CN | 107612126 | 1/2018 |
| CN | 109344107 | 2/2019 |
| CN | 112256513 | 1/2021 |
| CN | 110321171 | 2/2023 |
| TW | 201627862 | 8/2016 |

OTHER PUBLICATIONS

"Office Action of Taiwan Counterpart Application", issued on Jul. 23, 2025, p. 1-p. 8.

* cited by examiner

DEBUGGING SYSTEM METHOD USING UNIVERSAL ASYNCHRONOUS RECEIVER/TRANSMITTER (UART) INTERFACE BY SWITCHING BETWEEN USB OR ETHERNET INTERFACE FOR DATA TRANSMISSION REQUIREMENT

CROSS-REFERENCE TO RELATED APPLICATION

This application claims the priority benefit of U.S. provisional application Ser. No. 63/592,583, filed on Oct. 24, 2023 and China application serial no. 202410992241.2, filed on Jul. 23, 2024. The entirety of each of the above-mentioned patent applications is hereby incorporated by reference herein and made a part of this specification.

BACKGROUND

Technical Field

The disclosure relates to a communication interface technology, and more particularly, to a system and a method for interface management.

Description of Related Art

A universal asynchronous receiver/transmitter (UART) interface is a commonly used communication interface for an embedded system. The UART interface may be used to connect additional modules (e.g., satellite positioning modules or Bluetooth modules) or provide a debug port. Generally speaking, if there are multiple application requirements (e.g., debugging and data transmission), a corresponding number of UART interfaces are required. For a system with a single UART interface, even if there is an additional universal serial bus (USB) interface or Ethernet interface, the debug port may still occupy the unique UART interface and prevent other modules from using the UART interface.

SUMMARY

The disclosure provides a system and a method for interface management, which may use a single UART interface to complete multiple application requirements.

A system for interface management in the embodiment of the disclosure includes (but is not limited to) a main processor, a switch, and a first sub-circuit. The main processor includes a universal asynchronous receiver/transmitter (UART) interface and a control interface. The switch is coupled to the UART interface and the control interface. The first sub-circuit includes a first sub-interface. The first sub-interface is coupled to the switch. The switch conducts a transmission path between the UART interface and the first sub-interface according to a control signal received through the control interface.

A method for interface management in the embodiment of the disclosure includes (but is not limited to) the following steps. A main processor is provided. The main processor includes a UART interface. A control signal is transmitted through the main processor. A switch and a first sub-circuit are provided. The first sub-circuit includes a first sub-interface. A transmission path between the UART interface and the first sub-interface is conducted through the switch according to the control signal.

A system for interface management in the embodiment of the disclosure includes a UART interface, a switching circuit, a first sub-circuit, and a second circuit. The switching circuit is coupled to the UART interface. The first sub-circuit is coupled to the switching circuit, and the first sub-circuit includes a first sub-interface. The second circuit is coupled to the switching circuit, and the second circuit includes a second sub-interface. The switching circuit conducts a first transmission path between the UART interface and the first sub-interface according to a first control signal, or conducts a second transmission path between the UART interface and the second sub-interface.

Based on the above, the system and the method for interface management according to the embodiment of the disclosure may connect the transmission path through the UART interface through the switch. In this way, the main processor is allowed to connect one or more sub-circuits with the UART interface using the UART interface and conduct the transmission path connected to a specific sub-circuit according to application requirements.

In order for the aforementioned features and advantages of the disclosure to be more comprehensible, embodiments accompanied with drawings are described in detail below

DETAILED DESCRIPTION OF DISCLOSED EMBODIMENTS

Figure 1:
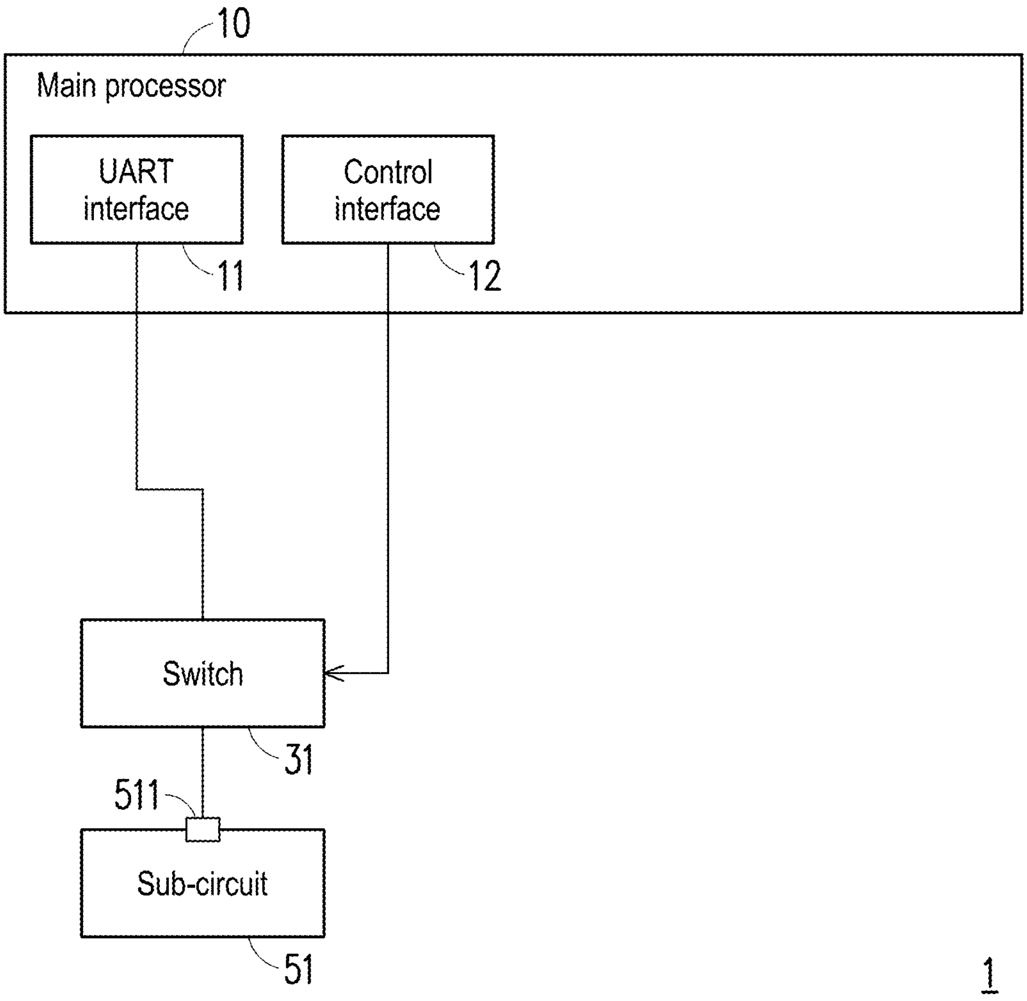
FIG. 1 is a block diagram of elements of a system according to an embodiment of the disclosure.

FIG. 1 is a block diagram of elements of a system 1 according to an embodiment of the disclosure. Referring to FIG. 1, the system 1 includes (but is not limited to) a main processor 10, a switch 31, and a sub-circuit 51.

In an embodiment, the system 1 is an embedded system. The embedded system may be used in communication, industry, automation, commerce, or military fields, but the embodiments of the disclosure do not limit application fields thereof. In other embodiments, the system 1 may also be other computer systems.

The main processor 10 may be a central processing unit (CPU), a graphic processing unit (GPU), a programmable general-purpose or special-purpose microprocessor, a digital signal processor (DSP), a programmable controller, a field programmable gate array (FPGA), an application-specific integrated circuit (ASIC), a neural network accelerator, or other similar elements or a combination of the above elements. In an embodiment, the main processor 10 is used to execute all or a part of operations of the system 1. For example, the main processor 10 executes a bootloader, and loads or executes an operating system, a kernel, a driver, firmware, and/or a file system.

The main processor 10 includes one or more universal asynchronous receiver/transmitter (UART) interfaces 11 and one or more control interfaces 12.

The UART interface 11 includes (but is not limited to) chips/controllers/processors/control circuits, circuit boards, and connectors (e.g., pins) that support a UART protocol. In an embodiment, the UART interface 11 is integrated into the main processor 10. In another embodiment, the UART interface 11 is a modular control panel or device, and is communicatively connected to the main processor 10.

The control interface 12 may be a general-purpose input/output (GPIO), a serial bus interface, a network interface, or other transmission interfaces. In an embodiment, the control interface 12 is integrated into the main processor 10. In another embodiment, the control interface 12 is a modular control panel or device (including chips/controllers/processors/control circuits, circuit boards, and connectors that supports corresponding communication protocols), and is communicatively connected to the main processor 10.

The switch 31 is coupled to the UART interface 11, the control interface 12, and the sub-circuit 51. Hereinafter, the switch 31 or other switches may also be referred to as switching circuits.

The sub-circuit 51 may be a satellite positioning circuit, a Bluetooth transceiver circuit, a USB connector, an Internet of thing (IoT) device, an Ethernet connector, or other circuits/modules/devices. The satellite positioning circuit may be a receiver that supports a global positioning system (GPS), a global navigation satellite system (GLObalnaya NAvigatsionnaya Sputnikovaya Sistema, GLONASS), a Beidou navigation satellite system, or a Galileo positioning system. The IoT device is, for example, a sensor, a home appliance, automation equipment, or a vehicle system, but the disclosure is not limited thereto.

The sub-circuit 51 includes a sub-interface 511. The sub-interface 511 is coupled to the switch 31. In an embodiment, the sub-interface 511 is an interface that supports or is compatible with UART, and may be directly or indirectly connected to the UART interface 11.

Figure 2:
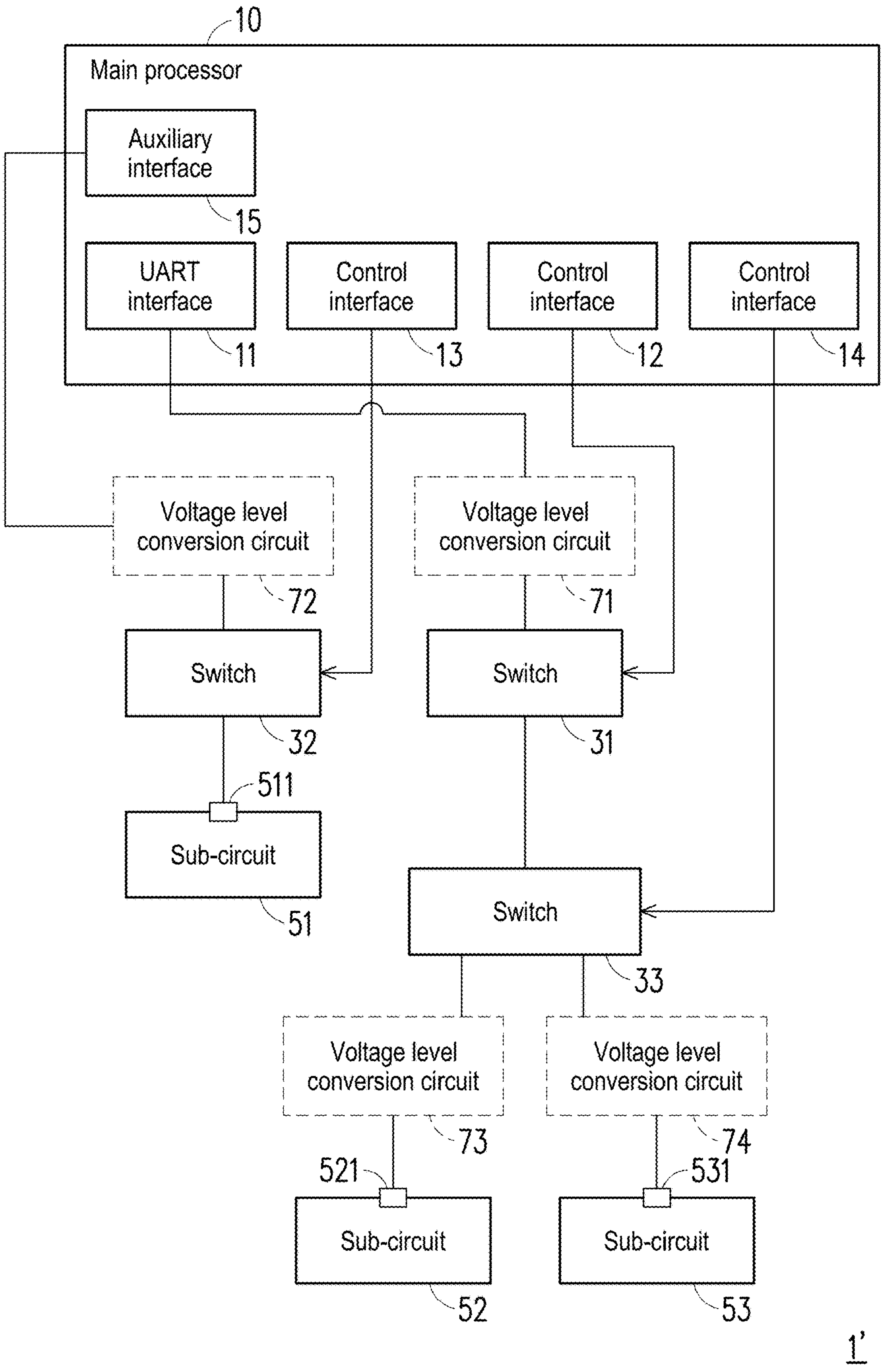
FIG. 2 is a block diagram of elements of a system according to another embodiment of the disclosure.

FIG. 2 is a block diagram of elements of a system 1' according to another embodiment of the disclosure. Referring to FIG. 2, compared to the system 1 in FIG. 1, the system 1' further includes switches 32 and 33 and sub-circuits 52 and 53. In addition, the main processor 10 further includes control interfaces 13 and 14 and an auxiliary interface 15.

Reference may be made to aforementioned descriptions of the control interface 12 in FIG. 1 for functions and implementations of the control interfaces 13 and 14. Therefore, the same details will not be repeated in the following.

The auxiliary interface 15 may be a universal serial bus (USB) interface or an Ethernet interface (for example, a RJ45 port is provided). The sub-circuit 51 may be a connector/device/module/circuit with a USB port or an Ethernet port. That is, the sub-interface 511 is the USB interface or the Ethernet interface.

The switch 32 is coupled to the switch 31, the auxiliary interface 15, and the sub-interface 511 of the sub-circuit 51.

The switch 33 is coupled to the switch 31 and the sub-circuits 52 and 53. The switch 33 includes a first port coupled to the UART interface 11, a control port coupled to the control interface 14, and multiple second ports coupled to the sub-circuits 52 and 53 respectively.

Reference may be made to aforementioned descriptions of the sub-circuit 51 in FIG. 1 for functions and implementations of the sub-circuits 52 and 53. Therefore, the same details will not be repeated in the following.

The sub-circuit 52 includes a sub-interface 521, and the sub-circuit 53 includes a sub-interface 531. The sub-interface 521 is coupled to the switch 33, and the sub-interface 531 is coupled to the switch 33. Reference may be made to aforementioned descriptions of the sub-interface 511 in FIG. 1 for functions and implementations of the sub-interfaces 521 and 531. Therefore, the same details will not be repeated in the following. For example, the sub-interfaces 521 and 531 are UART interfaces.

In an embodiment, the system 1' further includes voltage level conversion circuits 71 to 74.

The voltage level conversion circuit 71 is coupled between the UART interface 11 and the switch 31. The voltage level conversion circuit 72 is coupled between the auxiliary interface 15 and the switch 32. The voltage level conversion circuit 73 is coupled between the switch 33 and the sub-circuit 52.

In an embodiment, levels output by the voltage level conversion circuits 71 to 74 are consistent. For example, a voltage level of an output signal includes a first level and a second level. Voltage levels of the first level output by the voltage level conversion circuits 71 to 74 are consistent, and/or voltage levels of the second level output by the voltage level conversion circuits 71 to 74 are consistent.

It should be noted that the number of control interfaces 12 to 14 corresponds to the number of switches 31 to 33, which is, for example, one-to-one connection. However, in other embodiments, the number and connection methods of the control interfaces and the switches are not limited to those shown in FIG. 2, which is, for example, one-to-many connection. In addition, the number and connection methods of input ports and output ports of the switch may also be adjusted according to actual requirements, and the embodiments of the disclosure are not limited thereto.

Figure 3:
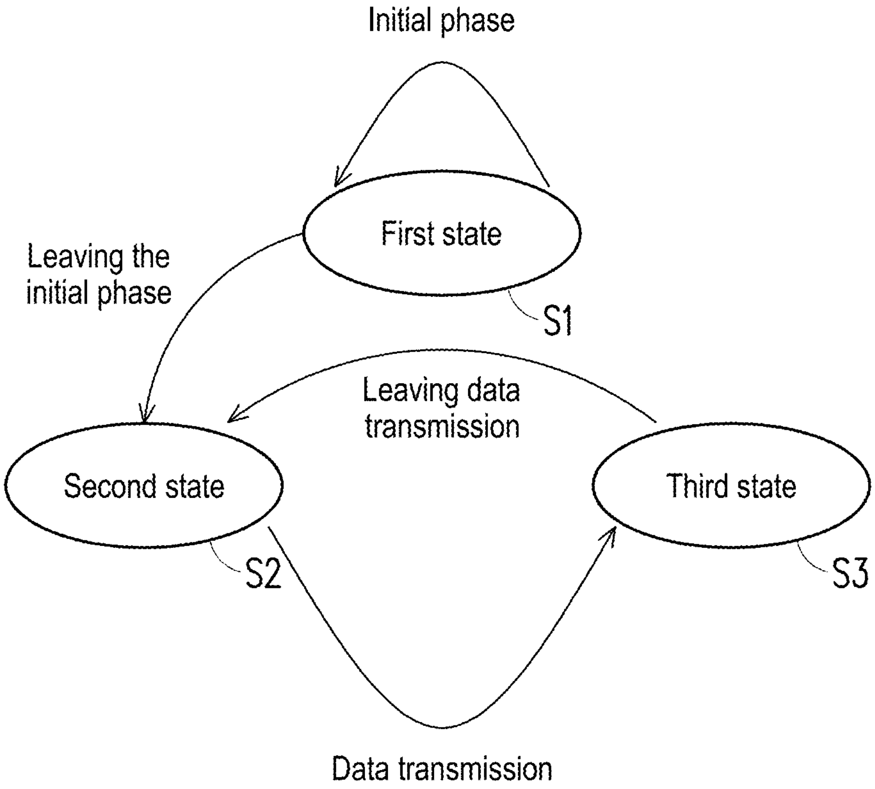
FIG. 3 is a schematic diagram of a state according to an embodiment of the disclosure.

FIG. 3 is a schematic diagram of a state according to an embodiment of the disclosure. Referring to FIG. 3, taking the system 1' in FIG. 2 as an example (reference may be made to the system 1 in FIG. 1), an operation state of the main processor 10 includes a first state S1, a second state S2, or a third state S3. The first state S1: in an initial phase (e.g., a booting or initialization phase) of the system 1', the main processor 10 may use the UART interface 11 to connect the sub-interface 511 for debug requirements (e.g., applications of a debug port). The debug requirements may be predefined or triggered through operations.

The second state S2: when completing/leaving the initial phase, the main processor 10 may use the auxiliary interface 15 to connect the sub-interface 511 for the debug requirements, and provide the UART interface 11 to the sub-circuit 52 or 53 for use at the same time.

The third state S3: if it is necessary to use the auxiliary interface 15 for a path of data transmission requirements, the main processor 10 may use the UART interface 11 to connect one of the sub-circuit 52 or 53 for the debug requirements. The data transmission requirements may be predefined or triggered through the operations. At this time, the other one of the sub-circuit 52 or 53 is disconnected from the UART interface 11 (for example, a transmission path from the UART interface 11 to the other one is interrupted). In some embodiments, the sub-circuit 52 or 53 serves as a satellite positioning circuit or other circuits, and hold over functions thereof may continuously provide a clock source required to maintain synchronization without being affected by path interruption. If there is no data transmission requirement using the auxiliary interface 15, the main processor 10 may return from the third state S3 to the second state S2.

It is worth noting that the sub-circuits 51 to 53 are jointly connected to the UART interface 11 through the switches 31 to 33 respectively. In other words, the sub-circuits 51 to 53 share the UART interface 11. In an embodiment, the switch 31, 32, or 33 may conduct a transmission path between the UART interface 11 and the sub-interface 511, 521, or 531 according to a control signal through the control interface 12, 13, or 14.

Figure 4:
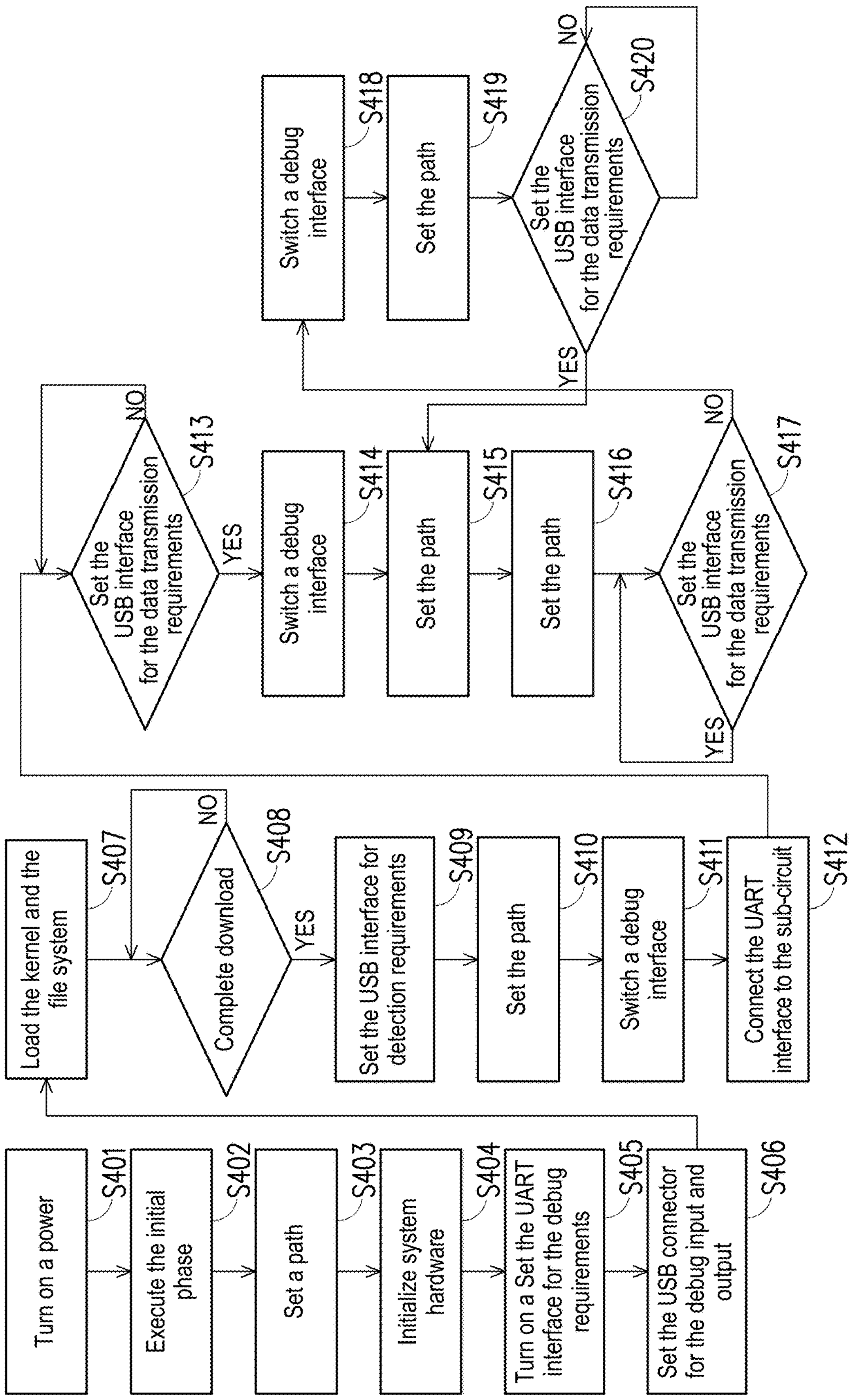
FIG. 4 is a flow chart of an operation according to an embodiment of the disclosure.

FIG. 4 is a flow chart of an operation according to an embodiment of the disclosure (an order of steps thereof may still be adjusted according to actual requirements and is not limited to an order shown in the drawing). Referring to FIG. 4, a power of the system 1' is turned on (step S401) (the main processor 10 may be coupled to a power supply). The main processor 10 executes related operations in the initial phase (step S402). For example, the bootloader or other booting load programs is executed. The main processor 10 sets a path (step S403). Referring to FIG. 3, when the main processor 10 is in the initial phase, the main processor 10 is in the first state S1.

Figure 5A:
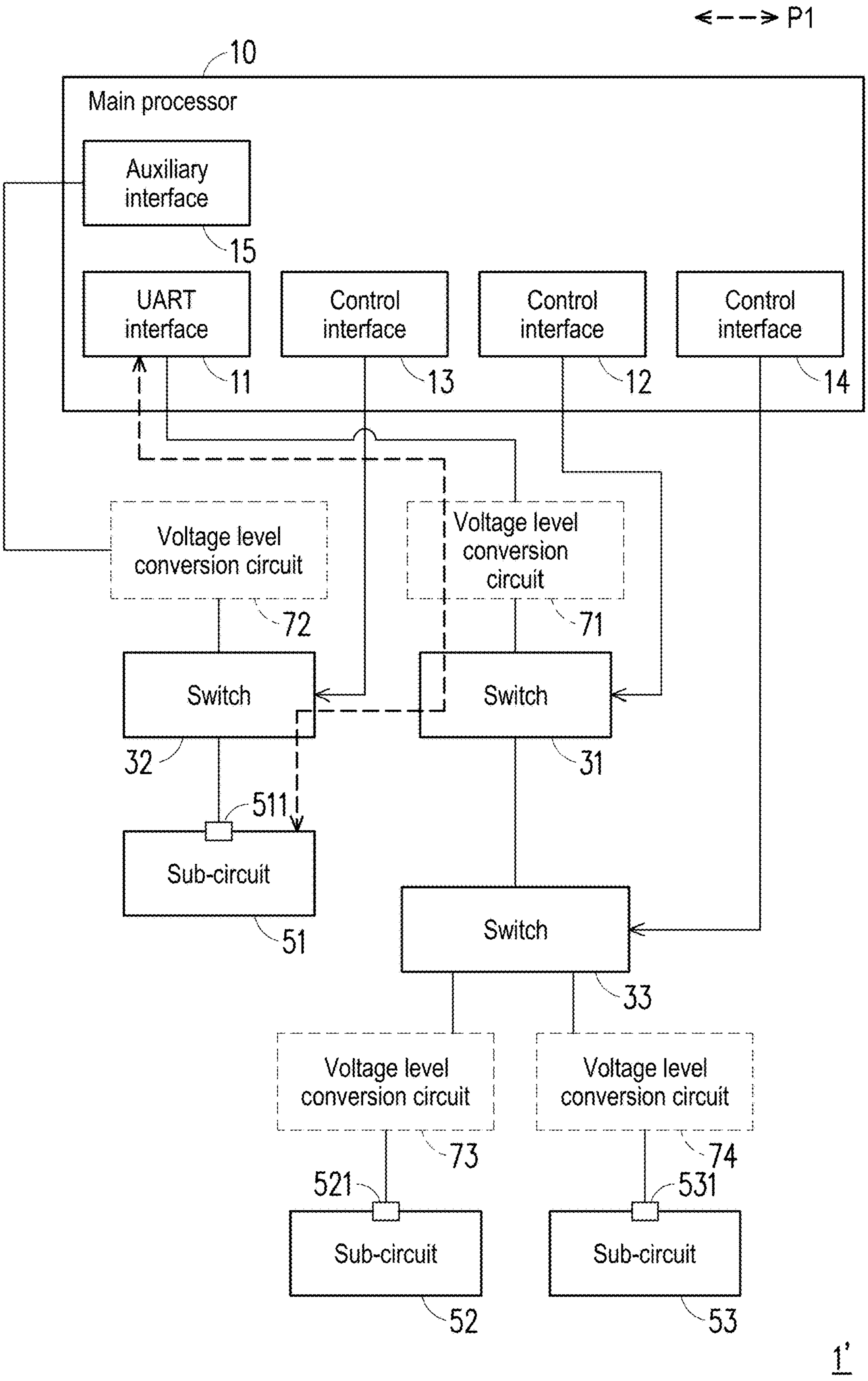
FIG. 5A is a schematic diagram illustrating a transmission path in an initial phase according to an embodiment of the disclosure.

FIG. 5A is a schematic diagram illustrating a transmission path in an initial phase according to an embodiment of the disclosure. Referring to FIG. 5A, in response to the main processor 10 being in the initial phase, the main processor 10 generates a control signal for conduction and conducts the transmission path (e.g., a path P1) through the UART interface 11 to the sub-interface 511. The path P1 is used for the debug requirements. More specifically, in the first state S1, the UART interface 11 is used for the debug requirements. For example, an (initial) message in the initial phase is transmitted to the UART interface 11 through the debug port. The main processor 10 generates the control signal. It is assumed that the sub-circuit 51 has the USB port or the Ethernet port. The USB port or the Ethernet port may be used as a debug port. The main processor 10 may set the path P1 as the UART interface 11, the switch 31, the switch 32, and the sub-interface 511 in sequence (step S403). The control signal instructs the aforementioned path P1 or conducts the path P1 to be transmitted to the switches 31 and 32 through the control interfaces 12 and 13. Then, the switches 31 and 32 conduct the UART interface 11 and the path P1 of the sub-interface 511 according to the control signal.

In addition, the main processor 10 may further set the control signal to interrupt the path from the UART interface 11 to the sub-interfaces 521 and 531.

In an embodiment, the control signal includes two voltage levels/potentials, which are the first level and the second level. For example, the first level is a high level, and the second level is a low level. Alternatively, the first level is a low level, and the second level is a high level. The conduction of the transmission path is associated with a voltage level of the control signal.

In an embodiment, in response to the control signal being at the first level, the switch conducts the transmission path. Taking FIG. 5A as an example, the control signals through the control interfaces 12 to 14 are preset to the second level (e.g., the low level). In the first state S1, the control signal through the control interface 13 is at the first level (e.g., the high level). Therefore, the path P1 through the switch 32 is conducted.

In an embodiment, in response to the control signal being at the second level, the switch interrupts the transmission path. Taking FIG. 5A as an example, the control signals through the control interfaces 12 to 14 are preset to the second level (e.g., the low level). Therefore, the path P1 through the switches 31 and 32 is interrupted. In the first state S1, the control signal through the control interface 13 is at the first level (e.g., the high level), but the control signal through the control interface 14 is still at the second level. Therefore, the path through the switch 33 is interrupted.

In other embodiments, the control signal may be in other forms of encoding.

Referring to FIG. 4, the main processor 10 performs a hardware initialization process (step S404). The main processor 10 sets the UART interface 11 for the debug requirements (step S405). For example, debug messages may be received or transmitted through the UART interface 11. The main processor 10 may set the USB connector (e.g., the sub-circuit 511 in FIG. 5A) for input/output of the debug port. Then, the main processor 10 loads the kernel and the file system (step S407).

The main processor 10 determines whether the kernel and image files have been downloaded (step S408) to determine whether to complete/leave the initial phase.

Figure 5B:
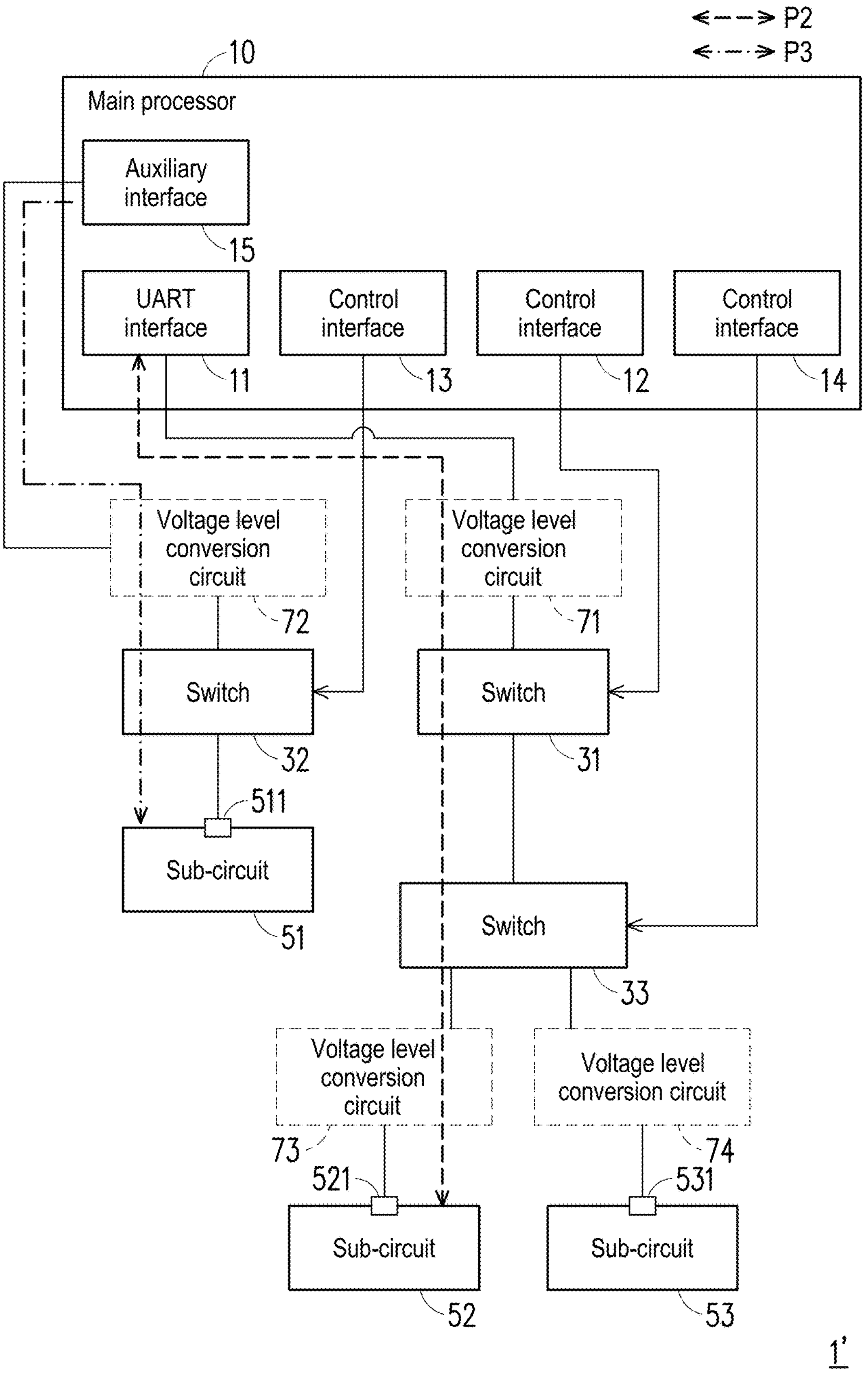
FIG. 5B is a schematic diagram illustrating a transmission path leaving the initial phase according to an embodiment of the disclosure.

FIG. 5B is a schematic diagram illustrating a transmission path leaving the initial phase according to an embodiment of the disclosure. Referring to FIG. 5B, in response to the main processor 10 leaving the initial phase, the main processor 10 generates the control signal for conduction and conducts the transmission path (e.g., a path P2) through the UART interface 11 to the sub-interface 521. The transmission path is used for the data transmission requirements. More specifically, in the second state S2, the auxiliary interface 15 may be used for the debug requirements. For example, the debug messages are transmitted to the auxiliary interface 15 through the debug port. The main processor 10 sets the auxiliary interface 15 (e.g., the USB interface or the Ethernet interface) for the debug requirements. Therefore, the UART interface 11 may be used by the sub-circuit 52 or 53 for the data transmission requirements. The main processor 10 generates the control signal. It is assumed that the sub-circuit 52 is a satellite positioning circuit. The main processor 10 may set the path P2 as the UART interface 11, the switch 31, the switch 33, and sub-interface 521 in sequence (step S410). The control signal instructs the aforementioned path P2 or conducts the path P2 to be transmitted to the switches 31 and 33 through the control interfaces 12 and 14. Then, the switches 31 and 33 conduct the UART interface 11 and the path P2 of the sub-interface 521 according to the control signal. In addition, the main processor 10 may further set the control signal to interrupt the path (as the path P1 in FIG. 5A) through the UART interface 11 to the sub-interface 511.

On the other hand, in response to the main processor 10 leaving the initial phase, the auxiliary interface 15 is used for the debug requirements. Therefore, the main processor 10 may convert the interface used for the debug requirements from the UART interface 11 to the auxiliary interface 15 (step S411). Taking FIG. 5B as an example, when the transmission path (e.g., the path P2) between the UART interface 11 and the sub-interface 521 is conducted, the switch 32 further conducts another transmission path (e.g., a path P3) between the auxiliary interface 15 and the sub-interface 511 according to another control signal from the control interface 13. More specifically, the main processor 10 generates the control signal. The main processor 10 may set the path P3 as the auxiliary interface 15, the switch 32, and the sub-interface 511 in sequence. The control signal instructs the aforementioned path P3 or conducts the path P3 to be transmitted to the switch 32 through the control interface 13. Then, the switch 32 conducts the path P3 of the auxiliary interface 15 and the sub-interface 511 according to the control signal to receive or transmit a debug signal. In addition, since the path P2 has been conducted, the main processor 10 may connect the UART interface 11 to the sub-circuit 52 (step S412). For example, the satellite positioning circuit (i.e., the sub-circuit 52) performs time synchronization through the UART interface 11.

The main processor 10 determines whether to set the auxiliary interface 15 (e.g., the USB interface or the Ethernet interface) for the data transmission requirements (step S413).

Figure 5C:
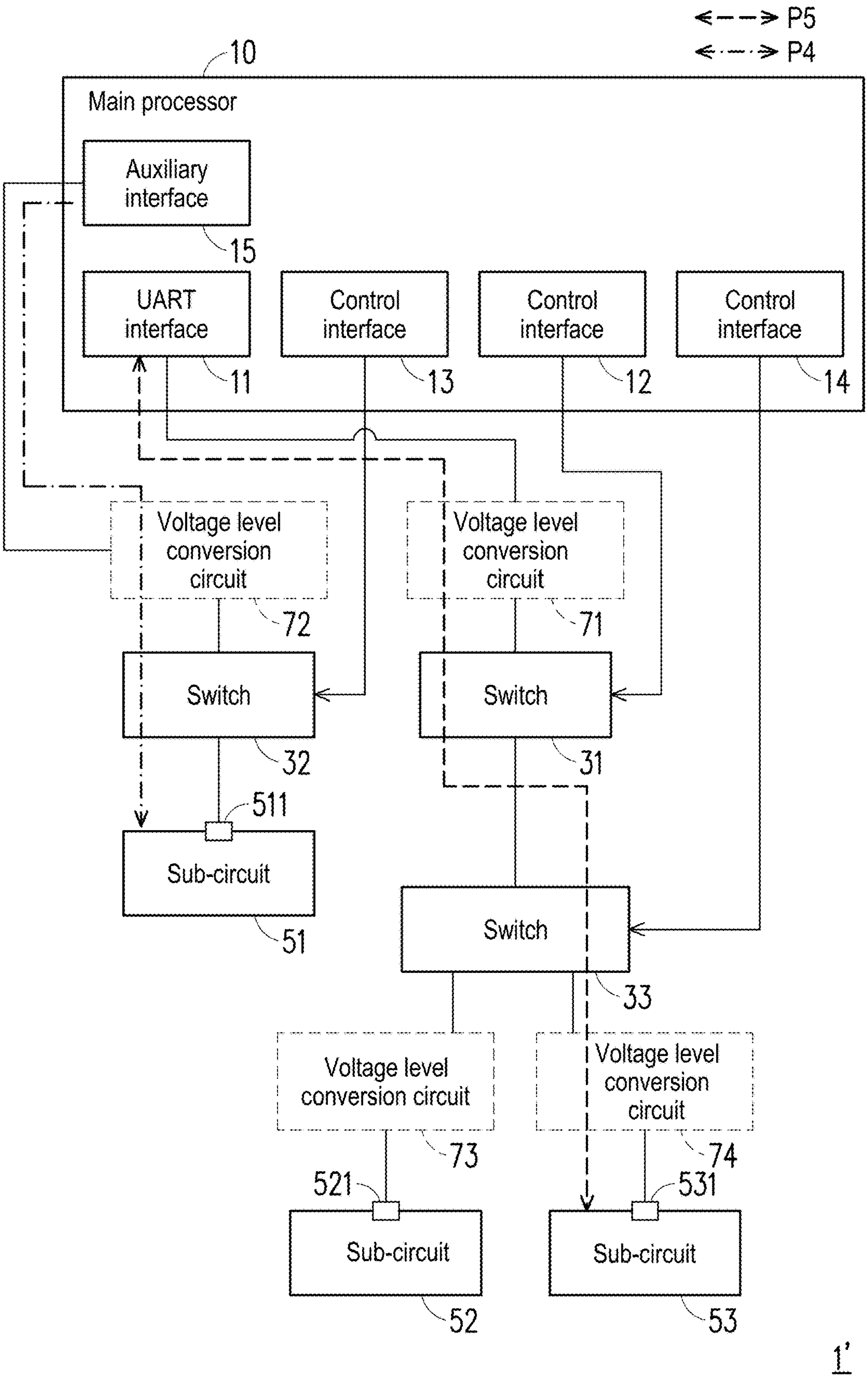
FIG. 5C is a schematic diagram illustrating a transmission path for data transmission requirements according to an embodiment of the disclosure.

In an embodiment, in response to detecting the data transmission requirements, the main processor 10 generates the control signal for conduction and conducts the transmission path. The transmission path is used for the debug requirements. If the auxiliary interface 15 is to be used for data transmission, the main processor 10 may switch the interface used for the debug requirements to the UART interface 11 (step S414). FIG. 5C is a schematic diagram illustrating a transmission path for data transmission requirements according to an embodiment of the disclosure. Referring to FIG. 5C, in the third state S3, the auxiliary interface 15 may be used for the data transmission requirements, and the UART interface 11 may be used for the debug requirements. For example, the debug messages are transmitted to the UART interface 11 through the debug port. In response to detecting the data transmission requirements, the main processor 10 may set the auxiliary interface 15 (e.g., the USB interface or the Ethernet interface) for the data transmission requirements. Therefore, the auxiliary interface 15 may be used by the sub-circuit 51 for the data transmission requirements. The main processor 10 generates the control signal. The main processor 10 may set a path P4 as the auxiliary interface 15, the switch 32, and the sub-interface 511 in sequence (step S415). The control signal instructs the aforementioned path P4 or conducts the path P4 to be transmitted to the switch 32 through the control interface 13. Then, the switch 32 conducts the path P4 of the auxiliary interface 15 and the sub-interface 511 according to the control signal.

On the other hand, the main processor 10 converts the interface used for the debug requirements from the auxiliary interface 15 to the UART interface 11. Taking FIG. 5C as an example, when the transmission path (e.g., a path P5) between the UART interface 11 and the sub-interface 531 is conducted, the switch 32 further conducts another transmission path (e.g., the path P4) between the auxiliary interface 15 and the sub-interface 511 according to another control signal from the control interface 13. More specifically, the main processor 10 generates the control signal. The main processor 10 may set the path P5 as the UART interface 11, the switch 31, the switch 33, and the sub-interface 531 in sequence (step S416). The control signal instructs the aforementioned path P5 or conducts the path P5 to be transmitted to the switches 31 and 33 through the control interfaces 12 and 14. Then, the switches 31 and 33 conduct the path P5 of the UART interface 11 and the sub-interface 531 according to the control signal for receiving or transmitting the debug signal. For example, the Bluetooth transceiver circuit (i.e., the sub-circuit 53) transmits the debug messages through the UART interface 11. In addition, the main processor 10 further sets the control signal for interruption to the control interface 14, so as to interrupt the path P2 shown in FIG. 5B. Assume that the sub-circuit 52 uses the hold over functions, it may continuously provide the clock source required to maintain the synchronization and receive satellite signals without being affected by the path interruption.

Next, the main processor 10 determines whether to set the auxiliary interface 15 (e.g., the USB interface or the Ethernet interface) for the data transmission requirements (step S417). If the auxiliary interface 15 is not required to be used for the data transmission requirements, the main processor 10 converts the interface used for the debug requirements from the UART interface 11 to the auxiliary interface 15 (step S418) and returns to the second state S2.

Taking FIG. 5B as an example, the main processor 10 may set the auxiliary interface 15 (e.g., the USB interface or the Ethernet interface) for the debug requirements. Therefore, the UART interface 11 may be used by the sub-circuit 52 or 53 for the data transmission requirements. The main processor 10 generates the control signal. It is assumed that the sub-circuit 52 is the satellite positioning circuit. The main processor 10 may set the path P2 as the UART interface 11, the switch 31, the switch 33, and the sub-interface 521 in sequence (step S419). The control signal instructs the aforementioned path P2 or conducts the path P2 to be transmitted to the switches 31 and 33 through the control interfaces 12 and 14. Then, the switches 31 and 33 conduct the path P2 of the UART interface 11 and the sub-interface 521 according to the control signal.

On the other hand, the main processor 10 generates another control signal. Taking FIG. 5B as an example, the main processor 10 may set the path P3 as the auxiliary interface 15, the switch 32, and the sub-interface 511 in sequence (step S419). The control signal instructs the aforementioned path P3 or conducts the path P3 to be transmitted to the switch 32 via the control interface 13. Then, the switch 32 conducts the path P3 of the auxiliary interface 15 and the sub-interface 511 according to the control signal to receive or transmit the debug signal. In addition, since the path P2 has been conducted, the main processor 10 may connect the UART interface 11 to the sub-circuit 52.

Next, the main processor 10 determines whether to set the auxiliary interface 15 (e.g., the USB interface or the Ethernet interface) for the data transmission requirements (step S420). If the auxiliary interface 15 is used for the data transmission requirements, the main processor 10 converts the interface used for the debug requirements from the auxiliary interface 15 to the UART interface 11 and return to the third state S3 (return to step S415).

In an embodiment, the main processor 10 further generates a data transmission enable signal to confirm whether to use the auxiliary interface 15 to perform data transmission functions.

According to FIGS. 4 to 5C, even if the system 1' only provides one UART interface 11 to the sub-circuits 51 to 53, some paths may still be conducted according to triggering of phases and/or requirements. In addition, in the embodiment of the disclosure, the interface used for the debug port may be further switched.

Figure 6:
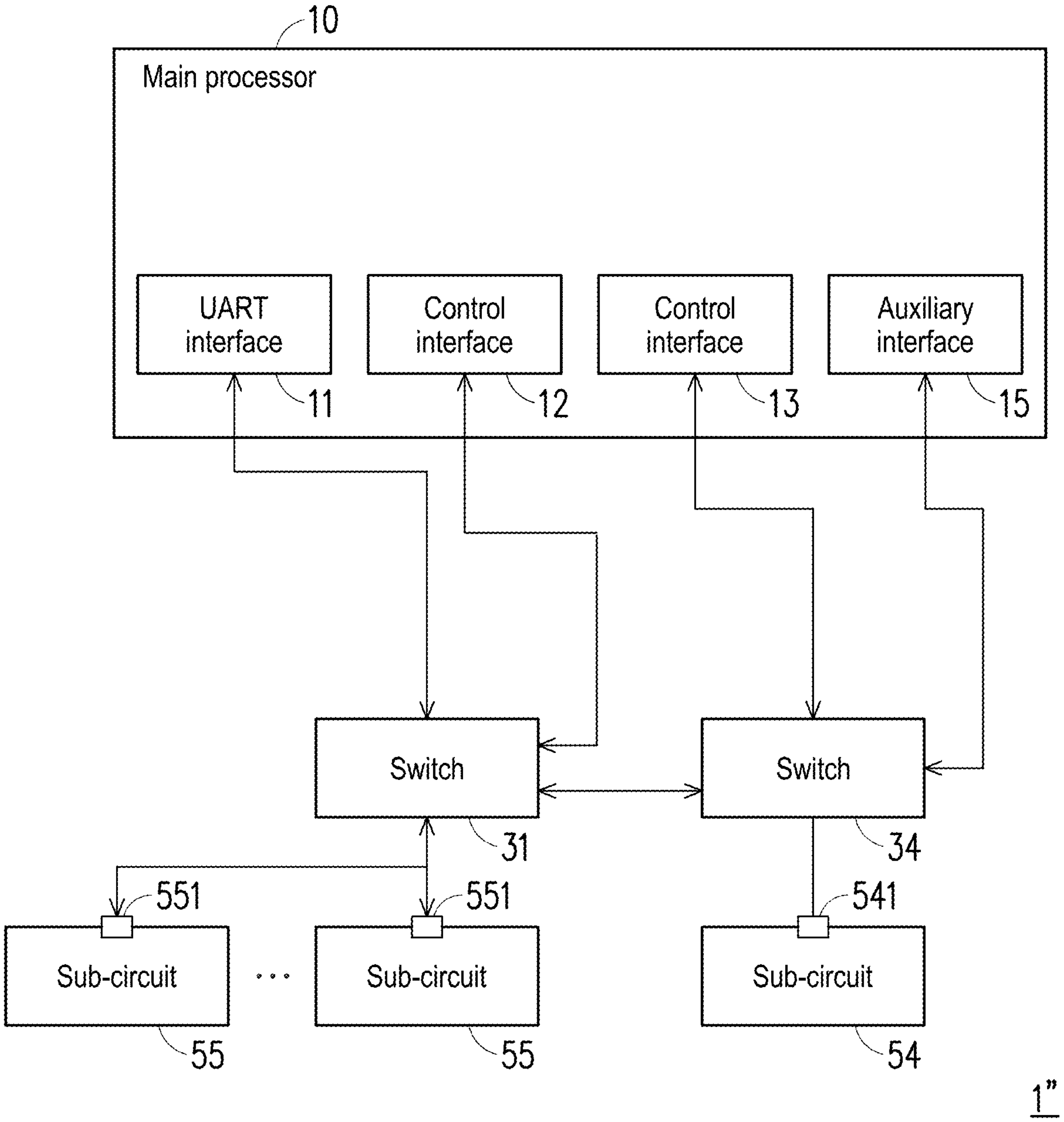
FIG. 6 is a block diagram of elements of a system according to another embodiment of the disclosure.

FIG. 6 is a block diagram of elements of a system 1" according to another embodiment of the disclosure. Referring to FIG. 6, compared to the system 1 in FIG. 1, the system 1" further includes a switch 34 and sub-circuits 54 and 55. In addition, the main processor 10 further includes the control interface 13 and the auxiliary interface 15.

Reference may be made to the aforementioned descriptions of the control interface 12 in FIG. 1 for functions and implementations of the control interface 13. Therefore, the same details will not be repeated in the following. Reference may be made to aforementioned descriptions of the auxiliary interface 15 in FIG. 2 for functions and implementations of the auxiliary interface 15. Therefore, the same details will not be repeated in the following.

The switch 31 is coupled to the UART interface 11, the control interface 12, the switch 34, and the sub-circuits 55. The switch 31 includes the first port coupled to the UART interface 11, a control port coupled to the control interface 12, and multiple second ports coupled to the sub-circuits 55 respectively.

The switch 31 is a one-to-many switch. In an embodiment, the switch 31 may be formed by a single circuit device. In another embodiment, the switch 31 may be formed by several switches.

The switch 34 is coupled to the auxiliary interface 15, the control interface 13, the switch 31, and the sub-circuit 54. In an embodiment, the switch 34 is used for switching between signals through the UART interface 11 and signals through the auxiliary interface 15.

The switch 34 is a 1-to-2 switch. In an embodiment, the switch 34 may be formed by a single circuit device. In another embodiment, the switch 34 may be formed by several switches.

Reference may be made to aforementioned descriptions of the sub-circuit 51 in FIG. 1 for functions and implementations of the sub-circuits 54 and 55. Therefore, the same details will not be repeated in the following.

The sub-circuit 54 includes a sub-interface 541, and the sub-circuit 55 includes a sub-interface 551. The sub-interface 541 is coupled to the switch 34, and the sub-interface 551 is coupled to the switch 31. Reference may be made to the aforementioned descriptions of the sub-interface 511 in FIG. 1 or 2 for functions and implementations of the sub-interfaces 541 and 551. Therefore, the same details will not be repeated in the following. For example, the sub-interface 541 is a USB or Ethernet interface, and the sub-interface 551 is a UART interface.

In an embodiment, the system 1" is an extension module board designed for a micro single-board computer (e.g., Raspberry Pi). The sub-circuits 55 are IoT devices and share the UART interface 11 through the switch 31. That is, as introduced in the aforementioned embodiments, the transmission path is conducted or interrupted according to the control signal. For example, the transmission path between the UART interface 11 and one sub-interface 551 is conducted, or the transmission path between the UART interface 11 and the sub-interface 541 is interrupted. However, the system 1" may still be applied to other computer systems.

Figure 7:
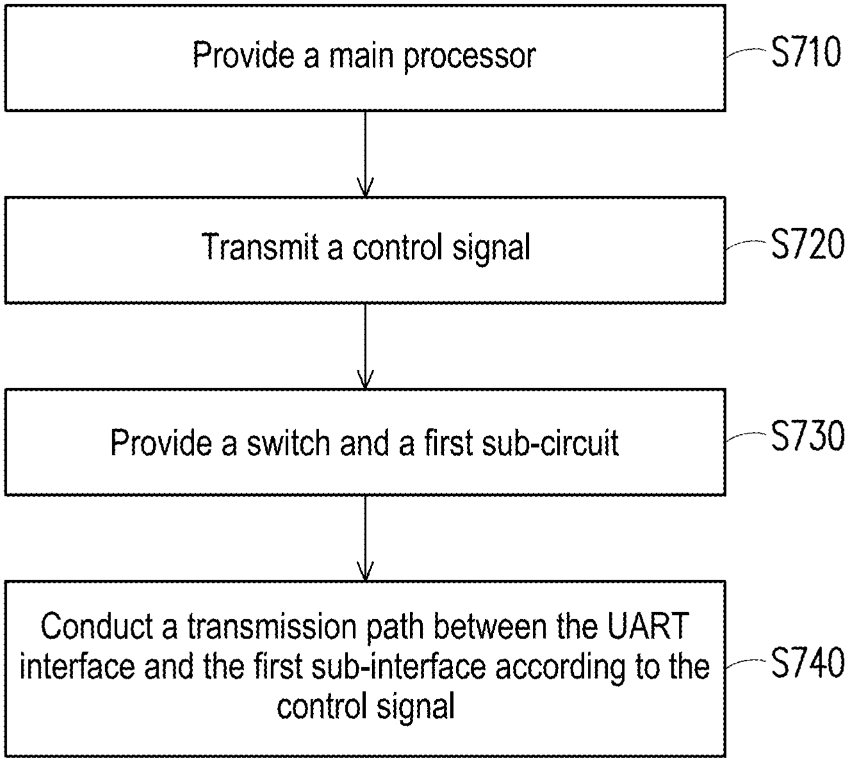
FIG. 7 is a flow chart of a method according to an embodiment of the disclosure.

FIG. 7 is a flow chart of a method according to an embodiment of the disclosure. Referring to FIG. 7, a main processor is provided (step S710), for example, the main processor 10 shown in FIGS. 1, 2, and 6. The main processor includes a UART interface, for example, the UART interface 11 shown in FIGS. 1, 2, and 6. A control signal is transmitted through the main processor (step S720). For example, the control signal is transmitted through the control interface 12 in FIG. 1, the control interfaces 12 to 13 in FIG. 2, or the control interfaces 12, 13, and 15 in FIG. 6. A switcher and a first sub-circuit are provided (step S730), for example, the switch 31 in FIG. 1, the switches 31 to 33 in FIG. 2, or the switches 31 and 34 in FIG. 6, the sub-circuit 51 in FIG. 1, the sub-circuits 51 to 53 in FIG. 2, or the sub-circuits 54 and 55 in FIG. 6. The first sub-circuit includes a first sub-interface, for example, the sub-interface 511 in FIG. 1, the sub-interfaces 511 to 531 in FIG. 2, or the sub-interfaces 541 and 551 in FIG. 6. A transmission path between the UART interface and the first sub-interface is conducted through the switch according to the control signal (step S740). For example, the path P1 in FIG. 5A, the paths P2 and P3 in FIG. 5B, or the paths P4 and P5 in FIG. 5C are conducted.

Implementation details of each of the steps in FIG. 7 have been described in detail in the aforementioned embodiments and implementations. Therefore, the same details will not be repeated in the following.

Based on the above, in the system and the method for interface management according to the embodiments of the disclosure, one or more sub-circuits and the UART interface are connected through the switch, and the transmission path from the UART interface to the sub-interfaces of some of the sub-circuits is conducted according to the control signal. In this way, the single UART interface may be used to meet design requirements for the sub-circuits that are required to connect the UART interfaces. In addition, in the embodiments of the disclosure, the auxiliary interface is combined, and the UART interface and the auxiliary interface are switched according to the requirements and phases for debugging.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A system for interface management, comprising:
- a main processor, comprising:
  - a universal asynchronous receiver/transmitter (UART) interface; and
  - a control interface;
- a switch coupled to the UART interface and the control interface; and
  - a first sub-circuit, comprising:
  - a first sub-interface coupled to the switch, wherein
  - the switch conducts a transmission path between the UART interface and the first sub-interface according to a control signal received through the control interface; and
- an auxiliary interface, wherein the auxiliary interface is a universal serial bus (USB) interface or an Ethernet interface, and is coupled to the switch, wherein
  - in response to the main processor being in an initial phase, the main processor generates the control signal for conduction and conducts the transmission path, wherein the transmission path is used for a debug requirement; or
  - in response to the main processor leaving the initial phase, the auxiliary interface is used for the debug requirement and the main processor generates the control signal for conduction and conducts the transmission path, wherein the transmission path is used for a data transmission requirement; or
  - in response to detecting the data transmission requirement, the auxiliary interface is used for the data transmission requirement and the main processor generates the control signal for conduction and conducts the transmission path, wherein the transmission path is used for the debug requirement.

2. The system for interface management according to claim 1, wherein
- in response to the control signal being at a first level, the switch conducts the transmission path; and
- in response to the control signal being at a second level, the switch interrupts the transmission path.

3. The system for interface management according to claim 1, further comprising:
   a second sub-circuit, comprising:
      a second sub-interface coupled to another switch, wherein
      the another switch conducts another transmission path between the UART interface and the second sub-interface according to the control signal received through another control interface of the main processor, and the another switch is coupled to the another control interface.

4. The system for interface management according to claim 1, wherein the switch comprises:
   a first port coupled to the UART interface;
   a control port coupled to the control interface; and
   a plurality of second ports, wherein one of the second ports is coupled to the first sub-circuit, and another one of the second ports is coupled to a second sub-circuit.

5. The system for interface management according to claim 1, wherein the first sub-circuit is a satellite positioning circuit, a Bluetooth transceiver circuit, a USB connector, or an Internet of thing (IOT) device.

6. A method for interface management, comprising:
   providing a main processor, wherein the main processor comprises a UART interface and an auxiliary interface;
   transmitting a control signal through the main processor;
   providing a switch and a first sub-circuit, wherein the first sub-circuit comprises a first sub-interface;
   conducting a transmission path between the UART interface and the first sub-interface through the switch according to the control signal,
   wherein a step of conducting the transmission path between the UART interface and the first sub-interface according to the control signal comprises:
      in response to the main processor being in an initial phase, generating, through the main processor, the control signal for conduction, and conducting the transmission path, wherein the transmission path is used for a debug requirement; or
      in response to the main processor leaving the initial phase, generating, through the main processor, the control signal for conduction, and conducting the transmission path, wherein the transmission path is used for a data transmission requirement, and using the auxiliary interface for the debug requirement; or
      in response to detecting the data transmission requirement, generating, through the main processor, the control signal for conduction, and conducting the transmission path, wherein the transmission path is used for the debug requirement, and using the auxiliary interface for the data transmission requirement.

7. The method for interface management according to claim 6, further comprising:
   in response to the control signal being at a first level, conducting, through the switch, the transmission path; and
   in response to the control signal being at a second level, interrupting, through the switch, the transmission path.

8. The method for interface management according to claim 6, further comprising:
   providing a second sub-circuit and another switch, wherein the second sub-circuit comprises a second sub-interface; and
   conducting, through the another switch, another transmission path between the UART interface and the second sub-interface according to the another control signal through the main processor.

9. A system for interface management, comprising:
   a main processor comprising a UART interface;
   a switching circuit coupled to the UART interface;
   a first sub-circuit coupled to the switching circuit, wherein the first sub-circuit comprises a first sub-interface;
   a second circuit coupled to the switching circuit, wherein the second circuit comprises a second sub-interface, wherein
   the switching circuit conducts a first transmission path between the UART interface and the first sub-interface according to a first control signal, or conducts a second transmission path between the UART interface and the second sub-interface; and
   an auxiliary interface coupled to the switching circuit, wherein the auxiliary interface is not a UART interface, wherein
      in response to the main processor being in an initial phase, the main processor generates the control signal for conduction and conducts the first transmission path, wherein the first transmission path is used for a debug requirement; or
      in response to the main processor leaving the initial phase, the auxiliary interface is used for the debug requirement and the main processor generates the control signal for conduction and conducts the first transmission path, wherein the first transmission path is used for a data transmission requirement; or
      in response to detecting the data transmission requirement, the auxiliary interface is used for the data transmission requirement and the main processor generates the control signal for conduction and conducts the first transmission path, wherein the first transmission path is used for the debug requirement.

10. The system for interface management according to claim 9,
   wherein
   when the first transmission path between the UART interface and the first sub-interface is conducted, the switching circuit conducts a transmission path between the auxiliary interface and the second sub-interface according to a second control signal.

* * * * *